United States Patent [19]
Suzuki

[11] Patent Number: 5,146,316
[45] Date of Patent: Sep. 8, 1992

[54] WHITE BALANCE ADJUSTING DEVICE

[75] Inventor: Masao Suzuki, Kanagawa, Japan

[73] Assignee: Canon Kabushiki Kaisha, Tokyo, Japan

[21] Appl. No.: 742,508

[22] Filed: Aug. 5, 1991

Related U.S. Application Data

[63] Continuation of Ser. No. 635,816, Jan. 2, 1991, abandoned, which is a continuation of Ser. No. 192,948, May 12, 1988, abandoned.

[30] Foreign Application Priority Data

May 15, 1987 [JP] Japan .................................. 62-116778

[51] Int. Cl.$^5$ .............................................. H04N 9/73
[52] U.S. Cl. .......................................... 358/29; 358/41
[58] Field of Search .................................... 358/29, 41

[56] References Cited

U.S. PATENT DOCUMENTS

| | | | |
|---|---|---|---|
| 4,449,487 | 2/1985 | Takayama et al. | 358/41 |
| 4,679,066 | 7/1987 | Masunaga et al. | 358/29 |
| 4,739,392 | 4/1988 | Ueda et al. | 358/29 |
| 4,739,393 | 4/1988 | Seki et al. | 358/29 |
| 4,774,564 | 9/1988 | Konishi | 358/29 |
| 4,827,331 | 5/1989 | Nakamura et al. | 358/29 C |
| 4,833,525 | 5/1989 | Suzuki et al. | 358/29 C |
| 4,847,680 | 7/1989 | Okino | 358/29 C |
| 4,918,519 | 4/1990 | Suzuki et al. | 358/29 C |

*Primary Examiner*—James J. Groody
*Assistant Examiner*—Mark R. Powell
*Attorney, Agent, or Firm*—Robin, Blecker, Daley & Driscoll

[57] ABSTRACT

A white balance adjusting device includes an image sensing element for converting object light to an electrical signal, an amplifier for amplifying the electrical signal obtained by this image sensing element, a control voltage limiting circuit for limiting an output voltage range of a control voltage for this amplifier and a detector for detecting an amount of ambient light, wherein a range of limitation of the control voltage is made variable on the basis of an output of the ambient light amount detector.

29 Claims, 5 Drawing Sheets

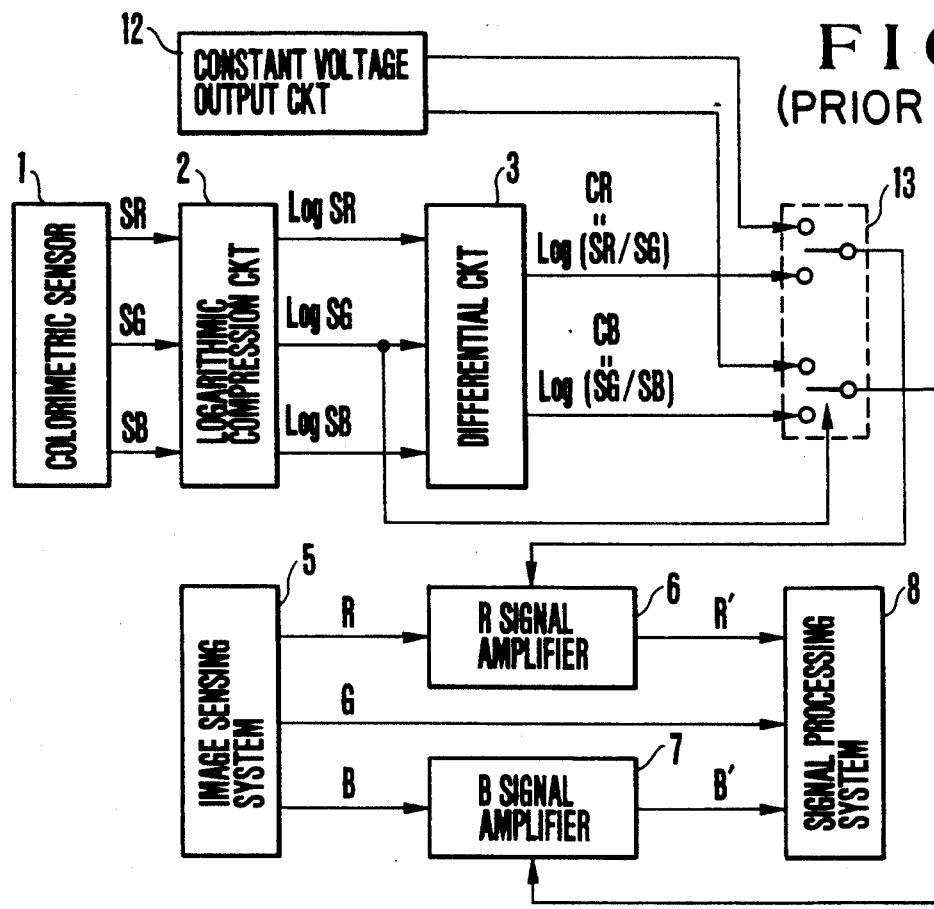
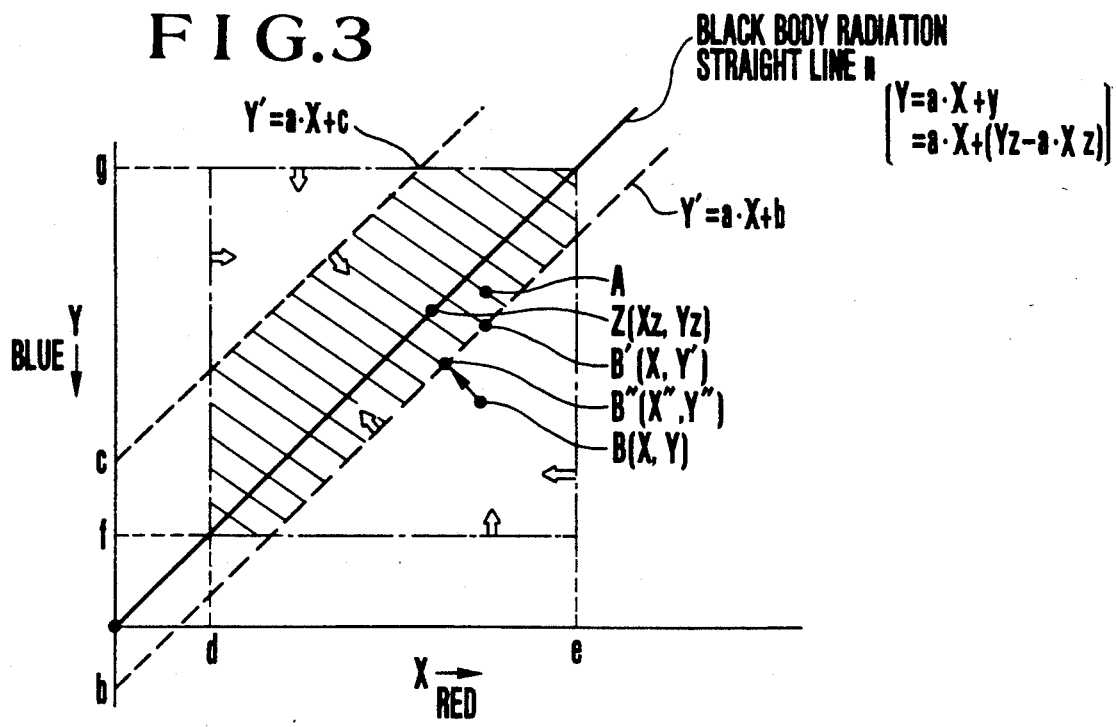

WHITE BALANCE ADJUSTING DEVICE

This is a continuation application under 37 CFR 1.62 of prior application Ser. No. 635,816, filed Jan. 2, 1991, now abandoned, which is a continuation of 192,948, filed may. 12, 1988, abandoned.

BACKGROUND OF THE INVENTION

1. Field of the Invention

This invention relates to a white balance adjusting device in color image sensing apparatus.

2. Description of the Related Art

The conventional white balance adjusting device for color image sensing apparatus is of the automatic follow-up type using an external sensor in colorimetry.

Its circuitry is shown in the block diagram of FIG. 1, comprising a colorimetric sensor 1 receptive of light from a given light source for photo-electrically converting its red, green and blue components, a logarithmic compression circuit 2 for logarithmically compressing the measured values of red, green and blue components by the sensor 1, a differential circuit 3 for subtracting the outputs of the logarithmic compression circuit 2, an image sensing system 5 receptive of light from an object to be photographed for producing R, G and B outputs, amplifiers 6 and 7 for the R and B signals respectively, and a signal processing circuit 8 for producing a certain video signal. For a case where little light is available on the colorimetric sensor 1, to control the R and B signal amplifiers 6 and 7 without using the output of the sensor 1, a constant voltage output circuit 12 is also included along with a switch 13 for changing over between the outputs of the colorimetric sensor 1 and the constant voltage output circuit 12.

In operating the device of FIG. 1, the colorimetric sensor 1 produces output signals $S_R$, $S_G$ and $S_B$ proportional to the values of the red, green and blue components of the light of the light source. Receiving these signals, the logarithmic compression circuit 2 then produces the outputs proportional to log $S_R$, log $S_G$ and log $S_B$. In the differential circuit 3, log $S_G$ is subtracted from log $S_R$, and log $S_B$ is subtracted from log $S_G$, to form control signals in the form of voltages for the R and B signal amplifiers 6 and 7 respectively. Then, while the red (R) and green (G) signals from the image sensing system 5 are amplified by the amplifiers 6 and 7, the white balance is adjusted in accordance with the above-identified control voltages.

With such control voltages alone, however, in a situation where the ambient light is so low in illumination to appreciably increase the rating of error in the outputs of the colorimetric sensor 1 and the logarithmic compression circuit 2, an incorrect white balance adjustment results. So, in the conventional device such as that shown in FIG. 1, when the illumination of the ambient light as measured in terms of the log $S_G$ fell below a predetermined reference level, the switch 13 was operated to replace the control voltages derived in the colorimetric sensor 1, logarithmic compression circuit 2 and differential circuit 3 by the constant voltage from the constant voltage output circuit 12. In this case, determination of a value of the constant voltage is made on assumption that the low illumination is from a light source of low color temperature (equivalent to that of candle or tungsten-filament lamp).

The prior art thus minimizes the risk of excessive deviation of the white balance when the ambient illumination is dim.

With such a conventional white balance adjusting device, however, because the fall of the $S_G$ of the sensor 1 as the indicator for the illumination of the ambient light below the certain level makes the control voltage invariantly the constant one, for all ambient lighting situations of lower green component than that level, which may be encountered, the information of the colorimetric sensor 1 has no effect at all. Therefore, if the color temperature of a given ambient light differed markedly from that assumed in setting the constant voltage, a serious problem arose in that the white balance deviated very largely from the ideal one.

SUMMARY OF THE INVENTION

This invention has been made to eliminate such a conventional problem and to provide a white balance adjusting device which, even when the illumination is low, enables the information from the colorimetric sensor to be used for preventing the white balance from largely deviating from the ideal one, and at the same time the influence of the error in the output of the colorimetric sensor to be suppressed.

To achieve this object, in an embodiment of the invention, the image sensing means receptive of light from an object to be photographed for producing electrical signals and the amplifier means for amplifying the electrical signals obtained from this image sensing means are used in combination with control voltage limiting means for limiting an output voltage range of a control voltage for the amplifier means and means for detecting the ambient light, whereby the the limited range of the control voltage is made changeable based on the output of the ambient light detecting means.

The use of such a construction and arrangement of the means of the device provides a possibility of making the most of the information of the colorimetric sensor and of suppressing the influence of the error in the output of the colorimetric sensor even when the illumination is low.

Other objects and features of the invention will become apparent from the following written specification and drawings.

BRIEF DESCRIPTION OF THE DRAWINGS

FIG. 1 is a block diagram illustrating the conventional white balance adjusting device.

FIG. 3 is a diagram explaining how to limit the range of control voltages in the circuit of FIG. 2.

DETAILED DESCRIPTION OF THE PREFERRED EMBODIMENTS

Figure 2:
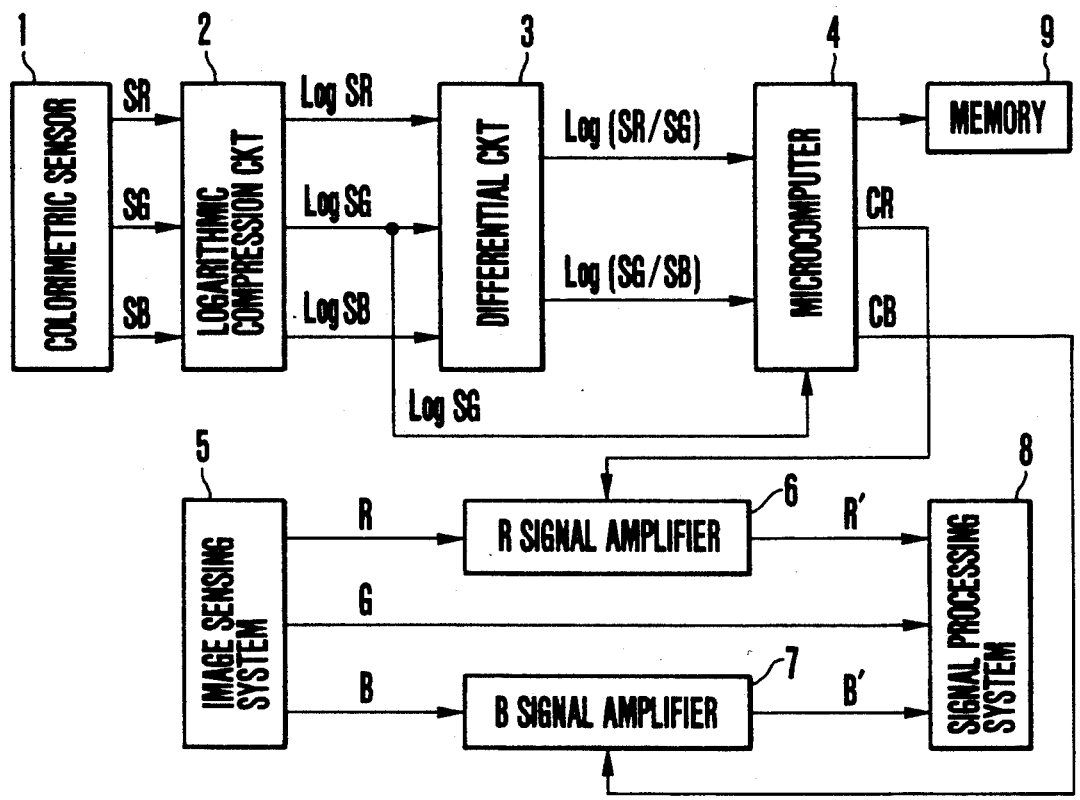
FIG. 2 is a block diagram of an embodiment of a white balance adjusting device according to the invention.
Figure 4:
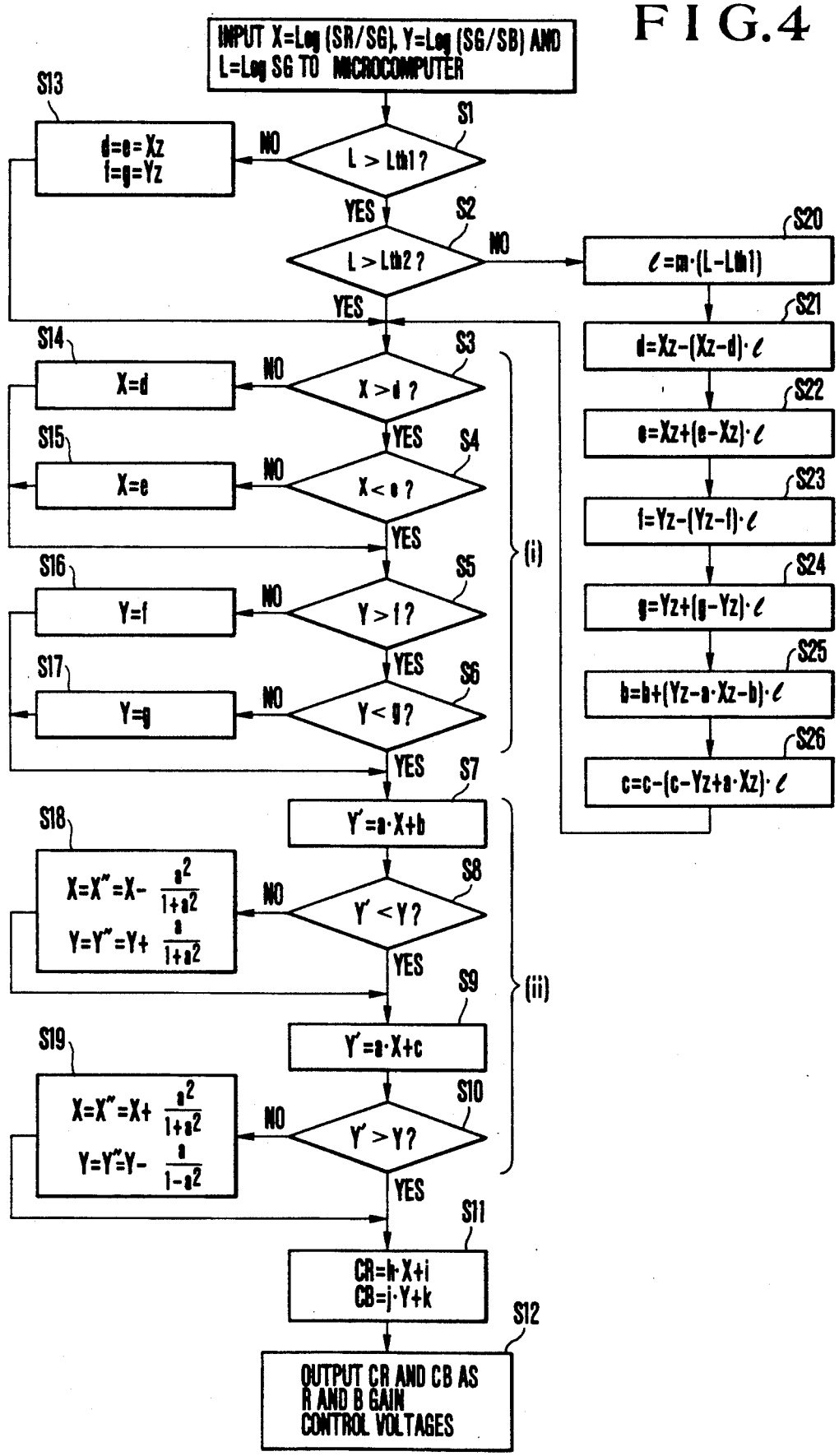
FIG. 4 is a flowchart of a program for the operation of the circuit of FIG. 2.

FIG. 2 in block diagram shows a white balance adjusting device which embodies the invention. FIG. 3 is a control voltage limitation graph for explaining FIG. 2. FIG. 4 is a flowchart for explaining FIG. 2.

In FIG. 2, 4 is a microcomputer for deriving gain control voltages from the outputs of the differential circuit 3. 9 is a memory for storing constants necessary to computation in this microcomputer 4. Also, the same reference characters as those in FIG. 1 denote the same or like parts.

In the following, by using FIGS. 2, 3 and 4, the embodiment of the invention is explained.

At first, similarly to the device of FIG. 1, the light of a light source is processed in the colorimetric sensor 1 to evaluate its R, B and G components, then in the logarithmic compression circuit 2 to logarithmically compress the values $S_R$, $S_G$ and $S_B$, and then in the differential circuit 3 where the differences between log R and log G and between log B and log G are taken to obtain $\log(S_R/S_G)$ and $\log(S_G/S_B)$. Not only these outputs $\log(S_R/S_G)$ and $\log(S_G/S_B)$, but also log $S_G$ is inputted to the microcomputer 4 in order to derive control voltages for properly correcting the white balance when they are applied to the R and G signal amplifiers 6 and 7. The process for producing such control voltages is described below by using FIG. 4.

The given $\log(S_R/S_G)$, $\log(S_G/S_B)$ and log $S_G$ are converted to digital signals by an A/D converter in the microcomputer 4, being read in as X, Y and L respectively.

Then, the L is compared with an $L_{th}1$ stored as a first reference value for the limit of illumination in the memory 9 (Step S1). Since the L is in direct proportion to the logarithm of the intensity of the ambient light, for a brighter situation than that indicated by the first limit reference value $L_{th}1$, $L>L_{th}1$ results. In the case of $L>L_{th}1$, the L is then compared with a second limit reference value $L_{th}2$, where $L_{th}2$ is a value corresponding to a more intense light than $L_{th}1$ (or $L_{th}2>L_{th}1$).

Here, $L_{th}2$ corresponds to a luminance at which a correction for low brightness of the white balance control starts, and $L_{th}1$ corresponds to another luminance at which the correction for low brightness of the white balance control reaches the extreme. For lower luminances than $L_{th}1$, the correction is made at no higher level than that.

Now assuming that $L>L_{th}1$ and $L>L_{th}2$ (step S2), or the luminance is so high that it is not necessary to perform any correction for low brightness, then a lower limit d for X is fetched to compare with the X in a step S3. If $X\leq d$, then put $X=d$ (step S14). If $X>d$, then leave it as it stands. Next, in a step S4, an upper limit e for X is fetched to compare with the X. If the $X>e$, then put $X=e$ (step S15). Otherwise leave it as it stands. (It should be noted that as for values of the d and e, they may be taken at appropriate ones as shown in FIG. 3.)

Likewise on Y, from steps S5 and S6, if $Y\leq f$, or $Y\geq g$, then put respectively $Y=f$ (step S16) or $Y=g$ (step S17). Otherwise leave them as they stand. By the steps executed so far, or a portion (i) of the flow of FIG. 4, it can be stipulated that the X and Y lie within a block enclosed by dot-and-dash lines shown in FIG. 3.

In the next step S7, $a\cdot X+b$ is computed, and the result designated Y' is compared with the Y. This implies that whether the point (X, Y) in the coordinates of FIG. 3 lies above or below a line defined by the equation $Y'=a\cdot X+b$ is determined (step S8). Taking an example of a point A above the line: $Y'=a\cdot X+b$, we have $Y'<Y$. In this case, the X and Y of the point A are left unchanged. Another point B, on the other hand, lies below the line: $Y'=a\cdot X+b$. So, $Y'>Y$ results. For this case, the step S8 is encountered by a loop (step S18) in which the X and Y of the point B are changed to X'' and Y'' according to the formulas $X''=X-a^2/(1+a^2)$ and $Y'=Y+a/(1+a^2)$. Thus, the point B is shifted to a point $B''(X'',Y'')$ in FIG. 3. In this connection, it should be pointed out that, suppose the point B is shifted right upwardly to a point $B'(X',Y')$, then because this direction is not perpendicular to a line n representing the color change of the light radiating from the black body, a large error will arise in the white balance adjustment. But, the shift to the point B'', because of being in the perpendicular direction to the line n, only the influence of the object color can be removed. Thus, the white balance can be adjusted without causing error to arise.

In the next step S9, a $X+c$ is computed. The result designated Y' is compared with the Y (step S10). That is, whether the given point (X, Y) lies above or below a line defined by $Y'=a\cdot X+c$ is determined. If below, or $Y'>Y$, do not shift it. Otherwise, change the X and Y of the point to X'' and Y'' based on the computation formulas: $X''=X+a^2/(1+a^2)$ and $Y''=Y-a/(1+a^2)$ (step S19). By the foregoing portions (i) and (ii) of the flowchart of FIG. 4, (X, Y) can be limited to within a hatched area in FIG. 3, thereby giving an advantage that the accuracy of adjustment is not greatly reduced by whatever color the object has. Another feature is that for green-richer lights than the light radiating from the black body in the line n, the limitations are widened (as in the left hand side half of the hatched area with respect to the line n in FIG. 3), thereby it being made possible to preserve the proper white balance adjustment even when the ambient light is from the green-rich light source, for example, a fluorescent lamp.

Alternatively assume that $L>L_{th}1$ and $L<L_{th}2$ (the luminance represented by $L=\log S_G$ is higher than the first limit, but lower than the second limit). At first, by a constant m which has been stored in the memory 9, $m\cdot(L-L_{th}1)$ is sought to obtain l (Step S20). (Here, m is determined so that when $L=L_{th}1$, $l=0$, and when $L=L_{th}2$, $l=1$, or defined as $m=1/L_{th}2-L_{th}1$)). Also, for a point of convergence, the values which the X and Y should take when it becomes very dim so that $L=L_{th}1$, which take their places at a point $Z(Xz,Yz)$ in FIG. 3 are previously stored in the memory. From the given values of Xz and Yz and the computed value l, the following equations are then calculated in sequence (steps S21, S22, S23 and S24).

| | |
|---|---|
| d = | Xz − (Xz − d) · l |
| e = | Xz + (e − Xz) · l |
| f = | Yz − (Yz − f) · l |
| g = | Yz + (g − Yz) · l |

Also, as a line n has a gradient "a", the value of its section y is found as follows: From $Yz=a$ $Xz+y$, $$y=Yz-a\cdot Xz$$

Hence, the line n can be expressed by the following equation:

$$Y=a\cdot X+(Yz-a\cdot Xz)$$

And, for the lines: $Y=a\cdot X+b$ and $Y=a\cdot X+c$, the values of the sections b and c are determined by the following equations in sequence (steps S25 and S26):

$$b=b+(Yz-a\cdot Xz-b)\cdot l$$

$$c = c - (c - Yz + a \cdot Xz) \cdot l$$

Based on such computation results, similarly to the case of $L > L_{th}1$ and $L > L_{th}2$, the ranges of variation of X and Y can be defined. The dimmer the illumination, the nearer the l approaches zero, and the narrower these ranges become (o the directions indicated by the double-shaft arrows in FIG. 3). And, when $l = 0$ is reached, $X = Xz$ and $Y = Yz$ result.

Alternatively assuming again that $L < L_{th}1$ (the luminance represented by $L = \log S_G$ is darker than the first limit), then $d = e = Xz$ and $f = g = Yz$ are obtained. Hence the only values which X and Y can take are Xz and Yz. The values of the $L_{th}1$ and $L_{th}2$ are determined so as to match the specification of the image sensing apparatus, and the values of Xz and Yz are determined depending on what color temperature the light source in the dimmest situation has.

Returning now to FIG. 2, the thus-found values of X and Y are used in deriving the control voltages $C_R$ and $C_B$ based on the computation formulas $C_R = h \cdot X + i$ and $C_B = j \cdot Y + k$. These control voltages $C_R$ and $C_B$ are processed in passing through a D/A converter in the microcomputer 4, before they are applied to the R and B signal amplifiers 6 and 7. Thus, the white balance is adjusted with improved accuracy and reliability.

Figure 5:
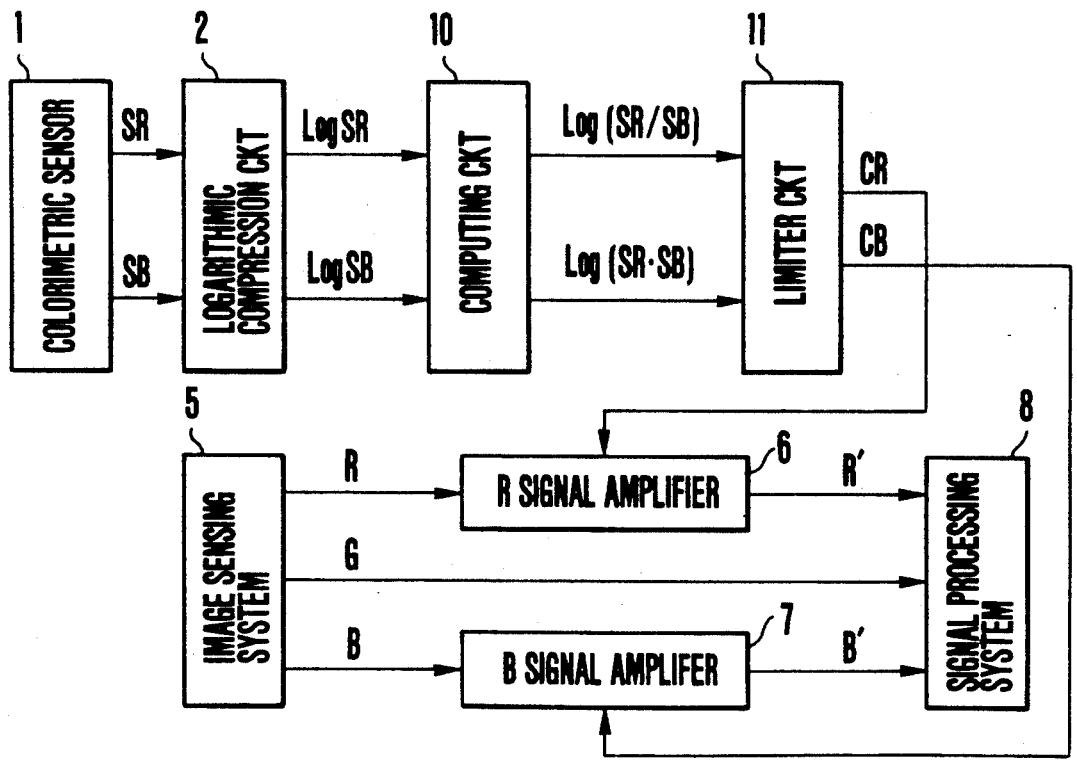
FIG. 5 is a block diagram illustrating another embodiment of the invention.

FIG. 5 in block diagram shows another embodiment of the invention in which a computing circuit 10 receptive of the outputs representing $\log S_R$ and $\log S_B$ of the logarithmic compression circuit 2 produces outputs representing $\log (S_R/S_B)$ and $\log (S_R \cdot S_B)$, which are then applied to a limiter circuit 11 of analog system, where the output $\log (S_R/S_B)$ of the computer circuit 10 is limited by the output $\log (S_R \cdot S_B)$. The other components are similar to those shown in FIG. 1 or FIG. 2, being denoted by the same reference numerals.

In FIG. 5, the red and blue components $S_R$ and $S_B$ of the light source are outputted from the colorimetric sensor 1, and logarithmically compressed in the circuit 2 to obtain $\log S_R$ and $\log S_B$. In the computing circuit 10, $\log(S_R/S_B)$ and $\log (S_R \cdot S_B)$ are obtained by subtraction and addition respectively.

Using $\log (S_R \cdot S_B)$ as the luminance information, when its value becomes small beyond a certain level, the limiter circuit 11 is caused to work, for the value of $\log (S_R/S_B)$ is limited. After that, the control voltages $C_R$ and $C_B$ for the R and B signal amplifiers 6 and 7 are derived. As an example of modification of this, the degree of limitation may be strengthened depending on the value of $\log (S_R \cdot S_B)$.

As has been described above, these embodiments are to narrow the limited range of the control voltages for the red and blue signal amplifiers down as the luminance of the ambient light decreases, so that for lower luminances, even when the certain level is exceeded, the information of the colorimetric sensor can be utilized. This realizes that the good white balance is prevented from suddenly collapsing, and that the influence of the error arising in the output of the colorimetric sensor is reduced.

Figure 6A:
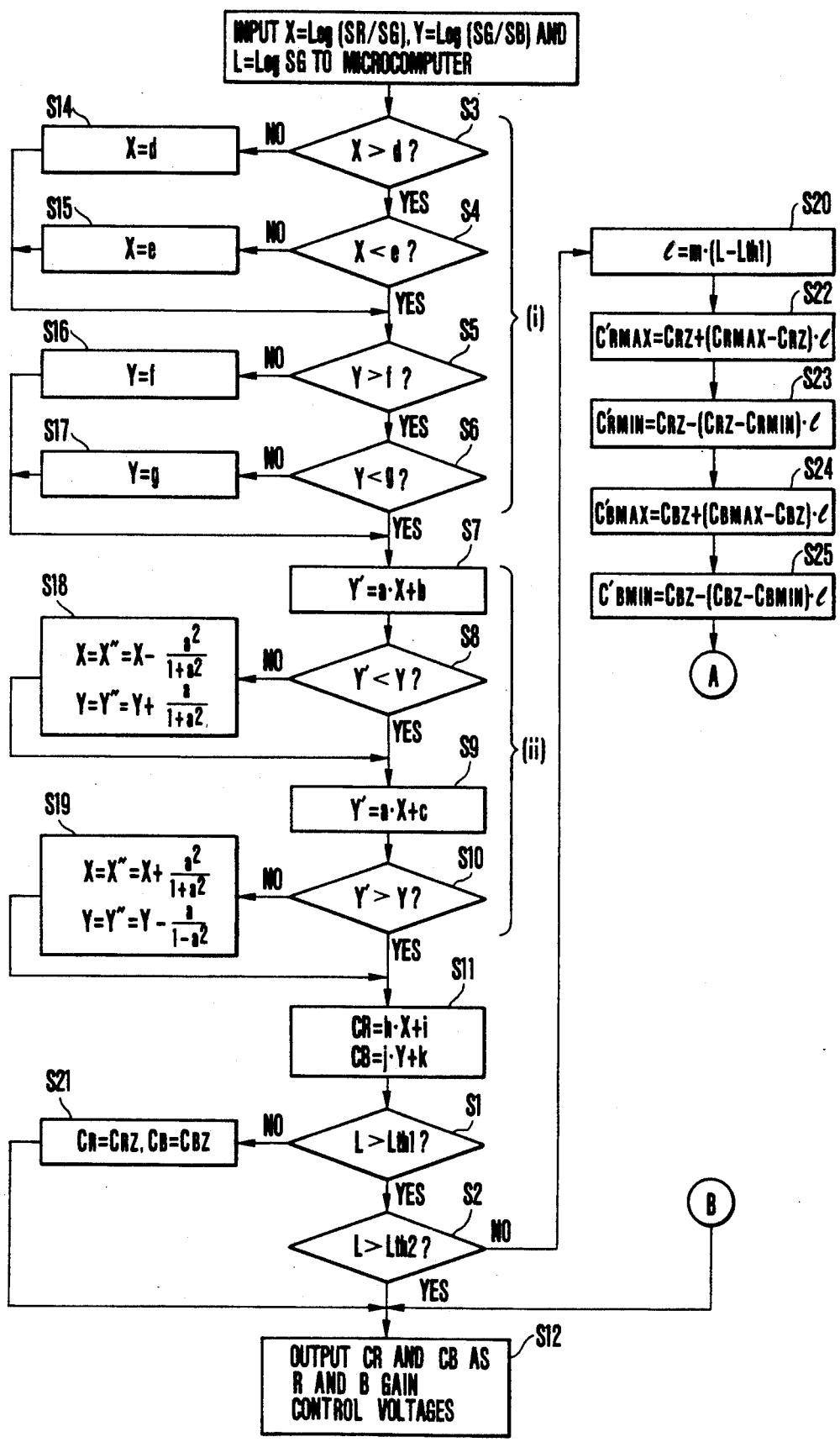
FIGS. 6(A) and 6(B) are flowcharts illustrating a third embodiment of the invention.
Figure 6B:
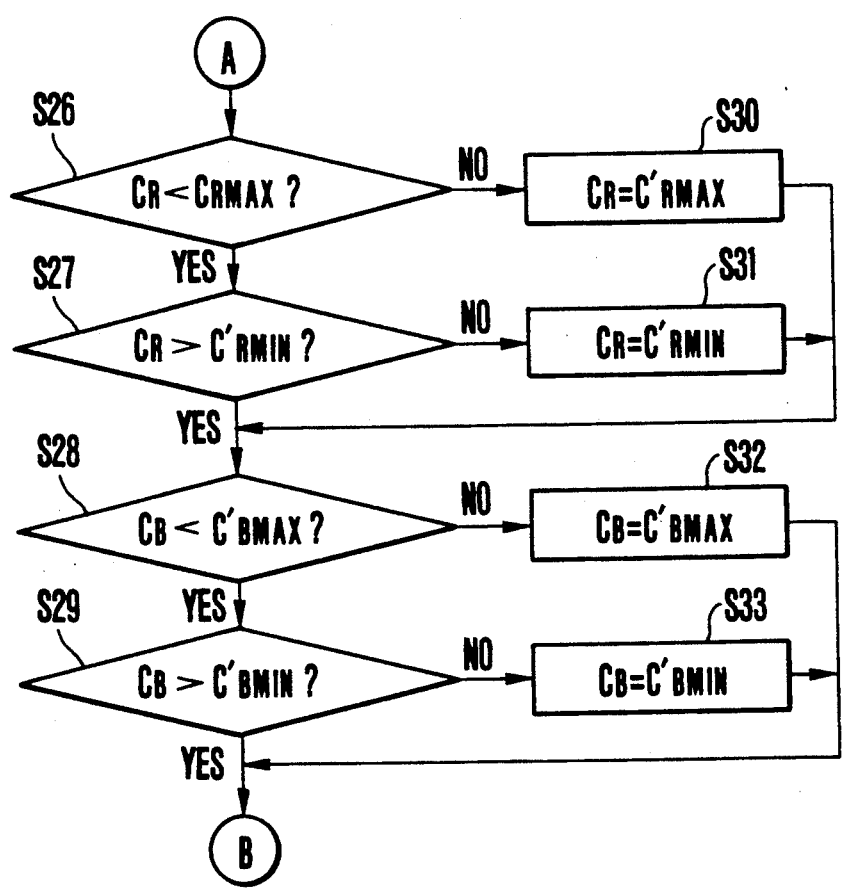

FIGS. 6(A) and 6(B) are flowcharts illustrating a third embodiment of the invention. In the following, using FIGS. 6(A) and 6(B), the third embodiment is explained.

In this embodiment, the process in the microcomputer 4 is different from that in the first embodiment. That is, depending on the luminance information L, whilst in the first embodiment, the ranges of values which X and Y can take are made variable in this embodiment the ranges of values which the gain control voltages $C_R$ and $C_B$ for the R and B signal amplifiers can take are made variable.

In the flowcharts of FIGS. 6(A) and 6(B), steps S1–S20 operate in respective similar manners to those described in connection with FIG. 4. Therefore, in this embodiment too, almost similarly to the first embodiment, the voltages $C_R$ and $C_B$ are obtained in the step S11. But, up to this stage, the luminance information L is not factored into the limitation yet.

Then, the flow advances from the step S11 to a step S1 in which L is compared with the first limit reference value $L_{th}1$. If $L < L_{th}1$, the flow advances to a step S21 in which $C_R = C_{RZ}$ and $C_B = C_{BZ}$ are set. Here, $C_{RZ}$ and $C_{BZ}$ are the gain control voltages corresponding to $Z(Xz,Yz)$ in FIG. 3, and given by the expression $C_{RZ} = h \cdot Xz + i$ and $C_{BZ} = j \cdot Yz + k$. Further, the flow advances to a step S12 in which they are outputted to the respective amplifiers 6 and 7 of FIG. 2.

Meanwhile, if $L > L_{th}1$ in the step S1, then L is compared with the second limit reference value $L_{th}2$ in a step S2. If yes in that step S2, the voltages $C_R$ and $C_B$ produced from the step S11 are applied to the respective amplifiers 6 and 7 without further alteration.

Also, if no in the step S2, the flow advances to a step S20 in which l is found likewise as in the first embodiment. Then, the flow advances to a step S22 in which $C'_{RMAX}$ is computed based on the following formula:

$$C'_{RMAX} = C_{RZ} + (C_{RMAX} - C_{RZ}) \cdot l$$

where $C_{RMAX}$ of the right side is the maximum value which the gain control voltage $C_R$ for the R signal amplifier can take in the hatched area of FIG. 3.

That is, in the step S22, as the L approaches $L_{th}1$ in response to the luminance L, the maximum value $C_{RMAX}$ of $C_R$ is changed to a value near to the $C_{RZ}$, and derived as $C'_{RMAX}$. Therefore, if $L = L_{th}1$ $(l=0)$, then $C'_{RMAX} = C_{RZ}$. If $L = L_{th}2$ $(l=1)$, then $C'_{RMAX} = C_{RMAX}$.

Then, the flow advances to a step S23, in which likewise as in the step S22, $$C'_{RMIN} = C_{RZ} + (C_{RMIN} - C_{RZ}) \cdot l$$

is derived. Here, $C_{RMIN}$ is the minimum value which $C_R$ can take in the hatched area of FIG. 3. Therefore, in the step S23 too, similarly to the step S22, depending on the luminance L, the $C'_{RMIN}$ is approaching now the $C_{RMIN}$ and then the $C_{RZ}$.

The next steps S24 and S25 also are similar to the steps S22 and S23. Here the maximum and minimum values which the gain control voltage $C_B$ for the B signal amplifier can take are varied with the luminance L, when $C'_{BMAX}$ and $C'_{BMIN}$ are obtained. (The $C_{BMAX}$ and $C_{BMIN}$ of the steps S24 and S25 are the maximum and minimum values which $C_B$ can take.)

After in such a manner the $C'_{RMAX}$, $C'_{RMIN}$, $C'_{BMAX}$ and $C'_{BMIN}$ have been derived, the flow advances to a step S26 in which the $C_R$ and $C'_{RMAX}$ found in the step S11 are compared with each other. If $C_R \leq C'_{RMX}$, then the flow advances to a step S30 in which $C_R = C'_{RMAX}$ is set. After that, the flow advances to a step S28.

Also if in the step S26 $C_R < C'_{RMAX}$, then the flow advances to a step S27 to compare it with $C'_{RMIN}$. If $C_R \leq C'_{RMIN}$, then the flow advances to a step S31 in which $C_R = C'_{RMIN}$ is set. After that, the flow advances to a step S28. If $C_R > C'_{RMIN}$, then the flow advances to the step S28 without any alteration. The step S28 and those that follow are a similar procedure for the $C_B$. That is, if $C_B \geq C'_{BMAX}$, then set $C_B = C'_{BMAX}$. If $C_B \leq C'_{BMIN}$, then set $C_B = C'_{MIN}$.

As the foregoing procedure has been done, the step S12 is executed to send the $C_R$ and $C_B$ as the gain control voltages to the respective R and B signal amplifiers 6 and 7. Thus, the white balance adjustment is carried out, while varying the range of limitation of the control voltage, depending on the luminance.

What is claimed is:

1. An image sensing apparatus comprising image sensing means for converting object light to an electrical signal, amplifier means for amplifying the electrical signal obtained from said image sensing means, control voltage forming means for forming a control voltage to control said amplifier means, said control voltage forming means including limiting means for limiting the control voltage within a limitative range, said amplifier means being controlled by the control signal limited by said limiting means, detecting means for detecting an amount of the object light, and setting means for variably setting the limitative range on the basis of an output of said detecting means.

2. An apparatus according to claim 1, wherein said detecting means includes a sensor for sensing a specific color component of the object light.

3. An apparatus according to claim 2, wherein said specific color component includes green color.

4. An apparatus according to claim 1, wherein said image sensing means forms a plurality of color signals.

5. An apparatus according to claim 4, wherein said amplifier means controls gains of the plurality of color signals relative to each other.

6. An apparatus according to claim 1, wherein said setting means is arranged to more narrowly set said limitative range in response to detection of the fact that the amount of ambient light is low by said detecting means.

7. An apparatus according to claim 1, wherein said limiting means and said setting means include a microcomputer.

8. An apparatus according to claim 1, further comprising a sensor for detecting a plurality of different color components of the ambient light.

9. An image sensing apparatus comprising:
(a) image sensing means for converting an image of an object to a plurality of color signals;
(b) adjusting means for adjusting while balance by adjusting gains of said plurality of color signals relative to each other;
(c) control signal forming means for forming a control signal to cause the white balance to be adjusted by said adjusting means in accordance with a color temperature, said control signal forming means including limiting means for limiting the control signal within a limitative range; and
(d) setting means for variably setting the limitative range in accordance with a luminance of an object.

10. An apparatus according to claim 9, wherein said adjusting means includes a plurality of variable gain amplifiers.

11. An apparatus according to claim 9, wherein said control means includes a plurality of sensors for detecting a plurality of different color components of an ambient light and comparing means for comparing outputs of said plurality of sensors with each other.

12. An apparatus according to claim 11, wherein said limiting means variably limits the limitative range on the basis of an output of one of said plurality of sensors.

13. A process for adjusting a white balance in accordance with a brightness of an object, namely an amount of ambient light, and a color temperature, comprising:
forming a control voltage on the basis of the color temperature to adjust the white balance;
variably setting a range of said control voltage in accordance with the brightness of the object;
limiting the control voltage within the set range of the control voltage; and
adjusting the white balance by using the control voltage limited within the set range.

14. An apparatus for adjusting a white balance on the basis of a control voltage in accordance with the brightness of an object and a color temperature, comprising:
first means for variably setting a range of said control voltage for adjusting the white balance in accordance with the brightness of the object;
second means for forming said control voltage in accordance with the color temperature and for limiting said control voltage within the set range of the control voltage; and
third means for adjusting the white balance on the basis of the control voltage limited within the set range.

15. An apparatus according to claim 14, wherein said first and second means include a microcomputer.

16. An apparatus according to claim 14, wherein said third means effects the adjustment of the white balance by varying a level of an electric signal obtained by converting a light of the object, in accordance with the level of said control voltage.

17. An apparatus according to claim 16, wherein said electrical signal includes a plurality of color signals corresponding to specific color components, respectively.

18. An apparatus according to claim 17, wherein said specific color components include a green color.

19. An apparatus according to claim 14, wherein said first means is operative to gradually vary the set range in accordance with the brightness of the object.

20. An apparatus according to claim 14, wherein said first means is operative to effect the range varying operation when the brightness of the object is lower than a predetermined value.

21. A process according to claim 13, wherein the white balance is adjusted by varying a level of an electrical signal obtained by converting an object light, in accordance with the level of said control voltage.

22. A process according to claim 21, wherein said electric signal includes a plurality of color signals corresponding to specific color components, respectively.

23. A process according to claim 22, wherein said specific color component sinclude a green color.

24. A process according to claim 13, wherein said range is gradually varied in accordance with the brightness of the object.

25. A process according to claim 13, wherein said setting operation is operable when the brightness of the object is lower than a predetermined value.

26. An image sensing apparatus, comprising
(a) image sensing means for sensing an image of an object to form an image signal which includes a plurality of color signal components;
(b) level adjusting means for adjusting levels of the plurality of color signal components;

(c) control signal forming means for forming a control signal to control said level adjusting means in accordance with a color temperature, said control signal forming means including limiting means for limiting the control signal within a limitative range, said level adjusting means being controlled by the control signal limited by said limiting means; and (d) setting means for variably setting the limitative range.

27. An image sensing apparatus, comprising (a) image sensing means for sensing an image of an object to form an image signal which includes a plurality of color signal components;

(b) level adjusting means for adjusting levels of the plurality of color signal components;

(c) control signal forming means for forming a control signal to control said level adjusting means in accordance with a color temperature.

(d) setting means variably setting a range of the control signal;

(e) discrimination means for discriminating whether or not the contorol signal formed by said control signal forming means is within the range set by said setting means; and (f) correction means for correcting the control signal in response to an output of said discrimination means.

28. An apparatus according to claim 27, wherein said setting means includes detection means for detecting an amount of object light and said setting means sets the range of the control signal on the basis of an output of said detection means.

29. An image sensing apparatus comprising (a) image sensing means for sensing an image of an object to form an image signal which includes a first and second color signal components;

(b) first adjusting means for adjusting a level of the first color signal component;

(c) second adjusting means for adjusting a level of the second color signal component;

(d) first control means for forming a first control signal to control said first adjusting means within a first control range in accordance with a color temperature;

(e) second control means for forming a second control signal to control said second adjusting means within a second control range in accordance with the color temperature; and (f) setting means for variably setting the first and second control ranges respectively.

* * * * *

UNITED STATES PATENT AND TRADEMARK OFFICE
CERTIFICATE OF CORRECTION

PATENT NO. : 5,146,316
DATED : September 8, 1992
INVENTOR(S) : Masao Suzuki

It is certified that error appears in the above-identified patent and that said Letters Patent is hereby corrected as shown below:

```
Col. 2, line 34.     Delete "the"
Col. 4, line 3.      Change "Y' = Y" to -- Y" = Y --
Col. 4, line 14.     Change "a X+c" to -- a·X+c --
Col. 4, line 37.     Change "1" to -- $\ell$ --
Col. 4, line 38.     Change "1=0" to -- $\ell = 0$ --
Col. 4, line 39.     Change "1=1" to -- $\ell = 1$ --
Col. 4, line 44.     Change "value 1" to -- value $\ell$ --
Col. 4, line 48-51.  Change "1" to -- $\ell$ --
Col. 4, line 54.     Change "a Xz+y" to -- a·Xz+y --
Col. 4, line 67.     Change "·1" to -- ·$\ell$ --
Col. 5, line 1.      Change "·1" to -- ·$\ell$ --
Col. 5, line 4.      Change "1" to -- $\ell$ --
Col. 5, line 7.      Change "o" to -- to --
Col. 5, line 8.      Change "1=0" to -- $\ell = 0$ --
Col. 5, line 22.     Change "CB" to -- $C_B$ --
Col. 5, line 29.     Change "lo" to -- log --
Col. 5, line 68.     After "variable" insert -- , --
Col. 6, line 27.     Change "1" to -- $\ell$ --
Col. 6, line 31.     Change "·1" to -- ·$\ell$ --
Col. 6, line 39.     Change "1=0" to -- $\ell = 0$ --
Col. 6, line 40.     Change "1=1" to -- $\ell = 1$ --
Col. 6, line 45.     Change "·1" to -- ·$\ell$ --
```

UNITED STATES PATENT AND TRADEMARK OFFICE
CERTIFICATE OF CORRECTION

PATENT NO. : 5,146,316
DATED : September 8, 1992
INVENTOR(S) : Masao Suzuki

It is certified that error appears in the above-identified patent and that said Letters Patent is hereby corrected as shown below:

Col. 6, line 62. Change "$RMX,$" to -- $RMX'$ --

Col. 6, line 66. Change "$C'_{RMN}$" to -- $C'_{RMN}.$ --

Col. 9, line 25. Change "contorol" to -- control --

Col. 10, line 11. Delete "a"

Signed and Sealed this

Twenty-third Day of November, 1993

Attest:

BRUCE LEHMAN

Attesting Officer

Commissioner of Patents and Trademarks